United States Patent
Amano et al.

(10) Patent No.: US 9,667,972 B2
(45) Date of Patent: May 30, 2017

(54) IMAGE CODING DEVICE, IMAGE CODING METHOD, AND IMAGE CODING INTEGRATED CIRCUIT

(71) Applicant: Panasonic Intellectual Property Management Co., Ltd., Osaka (JP)

(72) Inventors: Hiroshi Amano, Osaka (JP); Takeshi Tanaka, Osaka (JP); Masaki Maeda, Osaka (JP); Kenjiro Tsuda, Kyoto (JP); Masayasu Iguchi, Hyogo (JP); Youji Shibahara, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 14/555,825

(22) Filed: Nov. 28, 2014

(65) Prior Publication Data
US 2015/0085918 A1     Mar. 26, 2015

Related U.S. Application Data

(63) Continuation of application No. 12/301,630, filed as application No. PCT/JP2007/060516 on May 23, 2007, now abandoned.

(30) Foreign Application Priority Data

May 24, 2006  (JP) .................................. 2006-143840

(51) Int. Cl.
*H04N 7/12*      (2006.01)
*H04N 19/139*    (2014.01)
(Continued)

(52) U.S. Cl.
CPC ......... *H04N 19/139* (2014.11); *H04N 19/105* (2014.11); *H04N 19/109* (2014.11);
(Continued)

(58) Field of Classification Search
CPC ...... H04N 19/52; H04N 19/176; H04N 19/51; H04N 19/61; H04N 19/109; H04N 19/105;
(Continued)

(56) References Cited

U.S. PATENT DOCUMENTS 7,320,522 B2     1/2008 Fujimoto
2002/0150160 A1* 10/2002 Liu et al. ................. 375/240.16
(Continued)

FOREIGN PATENT DOCUMENTS

CN     1507751       6/2004
EP     1 653 745     5/2006
(Continued)

OTHER PUBLICATIONS

International Search Report issued Aug. 29, 2007 in International (PCT) Application No. PCT/JP2007/060516.
(Continued)

*Primary Examiner* — Gims Philippe
*Assistant Examiner* — Richard Carter
(74) *Attorney, Agent, or Firm* — Wenderoth, Lind & Ponack, L.L.P.

(57) ABSTRACT

When compression encoding processing of an image is performed in units of macroblocks using a pipeline structure, an application of a skip mode or the like according to MPEG4AVC to compression encode an encoding target block requires motion vectors and the like of adjacent blocks of the encoding target block. However, depending on a structure of the pipeline stages, the motion vectors may not be determined. In such cases, the skip mode cannot be applied to compression encode the encoding target block. This problem can be solved by (i) calculating all motion information candidates, of the encoding target block, corresponding to all motion information selectable by a previous
(Continued)

block of the encoding target block, and (ii) selecting, as the motion information of the encoding target block in the skip mode, the motion information corresponding to the motion information determined for the previous block.

5 Claims, 6 Drawing Sheets

(51) Int. Cl.
| | |
|---|---|
| H04N 19/52 | (2014.01) |
| H04N 19/176 | (2014.01) |
| H04N 19/51 | (2014.01) |
| H04N 19/61 | (2014.01) |
| H04N 19/109 | (2014.01) |
| H04N 19/137 | (2014.01) |
| H04N 19/436 | (2014.01) |
| H04N 19/105 | (2014.01) |
| H04N 19/43 | (2014.01) |

(52) U.S. Cl.
CPC ......... *H04N 19/137* (2014.11); *H04N 19/176* (2014.11); *H04N 19/43* (2014.11); *H04N 19/436* (2014.11); *H04N 19/51* (2014.11); *H04N 19/52* (2014.11); *H04N 19/61* (2014.11)

(58) Field of Classification Search
CPC .. H04N 19/137; H04N 19/436; H04N 19/139; H04N 19/43
USPC .......................... 375/240.02, 240.16, 240.24
See application file for complete search history.

(56) References Cited

U.S. PATENT DOCUMENTS

| | | | |
|---|---|---|---|
| 2003/0048847 A1 | 3/2003 | Yavits et al. | |
| 2003/0128762 A1* | 7/2003 | Nakagawa | H04N 19/00587 375/240.16 |
| 2003/0215014 A1 | 11/2003 | Koto et al. | |
| 2004/0057523 A1 | 3/2004 | Koto et al. | |
| 2004/0146108 A1 | 7/2004 | Hsia | |
| 2004/0252768 A1* | 12/2004 | Suzuki et al. | 375/240.24 |
| 2005/0152452 A1* | 7/2005 | Suzuki | H04N 19/176 375/240.16 |
| 2005/0286635 A1* | 12/2005 | Kumar | H04N 19/00151 375/240.16 |
| 2006/0062302 A1* | 3/2006 | Yin et al. | 375/240.16 |
| 2006/0222074 A1 | 10/2006 | Zhang | |
| 2007/0206675 A1 | 9/2007 | Tanaka | |
| 2007/0286281 A1 | 12/2007 | Tsuchiya et al. | |
| 2011/0293007 A1 | 12/2011 | Abe et al. | |
| 2011/0293016 A1 | 12/2011 | Suzuki | |

FOREIGN PATENT DOCUMENTS

| | | |
|---|---|---|
| JP | 2000-244925 | 9/2000 |
| JP | 2005-244503 | 9/2005 |
| JP | 2005-295526 | 10/2005 |
| JP | 3879741 | 2/2007 |
| WO | 2005/081541 | 9/2005 |

OTHER PUBLICATIONS

ISO/IEC 14496-10, "Information Technology—Coding of audio-visual objects—Part 10: Advanced video coding", International Standard, First Edition, Dec. 1, 2003.
ISO/IEC 13818-2, "Information Technology—Generic coding of moving pictures and associated audio information: Video", International Standard, Second Edition, Dec. 15, 2000.
ISO/IEC 14496-2, "Information Technology—Coding of audio-visual objects—Part 2: Visual", International Standard, Second Edition, Dec. 1, 2001.
Notice of Granting Patent Right issued Jun. 3, 2014 in corresponding Chinese Application No. 201010548570.6, with English language translation.
Office Action issued Oct. 17, 2011 in U.S. Appl. No. 12/301,630.
Extended European Search Report issued Jul. 28, 2016 in European Patent Application No. 07743950.3.
Li et al., "Direct Mode Coding for Bipredictive Slices in the H.264 Standard", IEEE Transactions on Circuits and Systems for Video Technology, IEEE Service Center, Piscataway, NJ, US, vol. 15, No. 1, Jan. 1, 2005 (Jan. 1, 2005), pp. 119-126, XP011124673, ISSN:1051-8215, DOI:10.1109/TCSVT.2004.837021.

* cited by examiner

FIG. 1

|  | TS1 | TS2 | TS3 | TS4 | ... |
|---|---|---|---|---|---|
| FIRST STAGE | $MB_n$ | $MB_{n+1}$ | ... | ... | ... |
| SECOND STAGE | $MB_{n-1}$ | $MB_n$ | $MB_{n+1}$ | ... | ... |
| THIRD STAGE | $MB_{n-2}$ | $MB_{n-1}$ | $MB_n$ | $MB_{n+1}$ | ... |
| FOURTH STAGE | $MB_{n-3}$ | $MB_{n-2}$ | $MB_{n-1}$ | $MB_n$ | $MB_{n+1}$ |

IMAGE CODING DEVICE, IMAGE CODING METHOD, AND IMAGE CODING INTEGRATED CIRCUIT

TECHNICAL FIELD

The present invention relates to an image encoding apparatus which compression encodes images, and in particular to speeding-up of compression encoding processing.

BACKGROUND ART

MPEG4AVC (Motion Pictures Experts Group 4 Advanced Video Coding) standard, which is a standard for compression encoding of images, defines a skip mode and a spatial direct mode as encoding modes.

When compression encoding (hereinafter, also referred to as simply "encoding") a target image (hereinafter, referred to as "encoding target image") in units of macroblocks of a predetermined size, for example, of 16*16 pixels, both of these encoding modes calculate the motion vector of the macroblock being encoded (hereinafter, referred to as "encoding target block") and the reference image number (hereinafter, a set of a motion vector and a reference image number are referred to as "motion information") identifying the reference image, based on the motion information of a plurality of macroblocks (hereinafter, referred to as "adjacent blocks") adjacent to the encoding target block, the reference image being equivalent in size with the encoding target block and used to predict an image of the encoding target block. After that, these encoding modes encode the difference information which is information showing the difference between the prediction image, of the encoding target block, predicted based on the calculated motion information, and the original image of the encoding target block.

In other words, because the motion information of the macroblock encoded in the skip mode or the spatial direct mode (hereinafter, also referred to as "skip mode or the like") can be calculated using the motion information of the adjacent blocks when the macroblock is decoded, it is not necessary to encode the motion information of the encoding target block. Thus, it is necessary only to encode the difference information indicating the difference between the prediction image of the encoding target block and the original image of the encoding target block. Accordingly, code amounts can be reduced by performing encoding in the skip mode or the like.

One conventionally known technique processes macroblocks in parallel using a pipeline structure in order to speed up encoding processing of an image.

As described above, in order to encode the encoding target block in the skip mode or the like, the motion information of the adjacent blocks are required.

For example, assume a case where the pipeline is divided into a first stage and a second stage, the first stage sequentially calculating the motion information of each macroblock encoded in the skip mode or the like, and the second stage, with respect to a macroblock which has been processed by the first stage, judging whether or not to perform the encoding in the skip mode or the like based on the code amount in the skip mode. In this case, when the processing by the first stage starts, if the processing by the second stage has not been completed on all the adjacent blocks of the encoding target block, the encoding mode has not been determined for all of the adjacent blocks.

In other words, the motion information has not been determined for all of the adjacent blocks, and thus, in the first stage, the motion information of the encoding target block cannot be calculated in the skip mode or the like.

An example of a technique for solving this problem is adopted by an image encoding apparatus disclosed by Patent Document 1. In the following, the image encoding apparatus according to Patent Document 1 is described.

The image encoding apparatus according to Patent Document 1 encodes the encoding target image in units of macroblocks which are processed in parallel using a pipeline structure. Starting from the upper left macroblock of the encoding target image, the image encoding apparatus processes one row of macroblocks in the horizontal direction, moves on to process the next row, and sequentially processes the macroblocks up to the bottom right macroblock.

In a case where the motion information of the macroblock (hereinafter, referred to as "previous block") on the left of the encoding target block has not been calculated when beginning to process the encoding target block, the image encoding apparatus of Patent Document 1 uses a block (hereinafter, referred to as "vicinity block") on the left of the previous block, for which the motion vector has been calculated, instead of using the previous block, to generate the motion information of the encoding target block in the skip mode.

After that, upon completion of calculating the motion information of the previous block, the image encoding apparatus confirms whether the calculated motion information of the previous block and the motion information of the vicinity block match each other, and, if these two match each other, is able to encode the encoding target block in the skip mode or the like.

Thus, even when the calculation of the motion information of the previous block has not been completed, the image encoding apparatus of Patent Document 1 calculates the motion vector of the encoding target block using the motion information of the vicinity block, thereby realizing speeding-up of the encoding processing without hindering the pipelined parallel processing.

Patent Document 1: Japanese Patent Publication No. 3879741

DISCLOSURE OF THE INVENTION

Problems the Invention is Going to Solve

However, because the image encoding apparatus according to Patent Document 1 calculates the motion vector of the encoding target block using the motion information of the vicinity block, it is often the case that the calculated motion information of the previous block and the motion information of the vicinity block do not match each other. In this case, the encoding target block cannot be encoded in the skip mode or the like.

The present invention is conceived in view of the above problem and aims to provide an image encoding apparatus that is able to realize speeding-up of the encoding processing with use of a method different from the conventional method.

Means of Solving the Problems

In order to solve the stated problem, the image encoding apparatus of the present invention is an image encoding apparatus which compression encodes an image in units of blocks of a predetermined size and comprises: a first processing unit operable to sequentially generate candidate designation information corresponding to each of the blocks, based on candidate designation information corresponding to a prior block which has been processed prior to the block, each candidate designation information designating a plurality of prediction images as candidates for a prediction image of the corresponding block; and a second processing unit operable to, in parallel with generation of the candidate designation information corresponding to the block by the first processing unit, (i) select, as a prediction image of one of the blocks which has been processed by the first processing unit, a prediction image from among the plurality of prediction images indicated by the candidate designation information corresponding to the one of the blocks, based on prediction image designation information designating a prediction image of a block processed prior to the one of the blocks, (ii) outputs a difference signal showing a difference which is between the selected prediction image and an original image of the one of the blocks, and is to be reflected in a result of compression encoding of the one of the blocks, and (iii) generates prediction image designation information designating the selected prediction image.

Also, in order to solve the stated problem, the image encoding method used by the image encoding apparatus of the present invention is an image encoding method which compression encodes an image in units of blocks of a predetermined size and comprises: a first processing step of sequentially generating candidate designation information corresponding to each of the blocks, based on candidate designation information corresponding to a prior block which has been processed prior to the block, each candidate designation information designating a plurality of prediction images as candidates for a prediction image of the corresponding block; and a second processing method of, in parallel with generation of the candidate designation information corresponding to the block in the first processing step, (i) selecting, as a prediction image of one of the blocks which has been processed by the first processing unit, a prediction image from among the plurality of prediction images indicated by the candidate designation information corresponding to the one of the blocks, based on prediction image designation information designating a prediction image of a block processed prior to the one of the blocks, (ii) outputting a difference signal showing a difference which is between the selected prediction image and an original image of the one of the blocks, and is to be reflected in a result of compression encoding of the one of the blocks, and (iii) generating prediction image designation information designating the selected prediction image.

Also, in order to solve the stated problem, the computer program used in the image encoding apparatus of the present invention is a computer program for causing a computer to perform compression encoding processing which compression encodes an image in units of blocks of a predetermined size and comprises: a first processing step of sequentially generating candidate designation information corresponding to each of the blocks, based on candidate designation information corresponding to a prior block which has been processed prior to the block, each candidate designation information designating a plurality of prediction images as candidates for a prediction image of the corresponding block; and a second processing method of, in parallel with generation of the candidate designation information corresponding to the block in the first processing step, (i) selecting, as a prediction image of one of the blocks which has been processed by the first processing unit, a prediction image from among the plurality of prediction images indicated by the candidate designation information corresponding to the one of the blocks, based on prediction image designation information designating a prediction image of a block processed prior to the one of the blocks, (ii) outputting a difference signal showing a difference which is between the selected prediction image and an original image of the one of the blocks, and is to be reflected in a result of compression encoding of the one of the blocks, and (iii) generating prediction image designation information designating the selected prediction image.

Further more, in order to solve the stated problem, the integrated circuit used by the image encoding apparatus of the present invention is an integrated circuit used for image encoding, the integrated circuit compression encoding an image in units of blocks of a predetermined size and comprising: a first processing unit operable to sequentially generate candidate designation information corresponding to each of the blocks, based on candidate designation information corresponding to a prior block which has been processed prior to the block, each candidate designation information designating a plurality of prediction images as candidates for a prediction image of the corresponding block; and a second processing unit operable to, in parallel with generation of the candidate designation information corresponding to the block by the first processing unit, (i) select, as a prediction image of one of the blocks which has been processed by the first processing unit, a prediction image from among the plurality of prediction images indicated by the candidate designation information corresponding to the one of the blocks, based on prediction image designation information designating a prediction image of a block processed prior to the one of the blocks, (ii) outputs a difference signal showing a difference which is between the selected prediction image and an original image of the one of the blocks, and is to be reflected in a result of compression encoding of the one of the blocks, and (iii) generates prediction image designation information designating the selected prediction image.

Here, the blocks of the predetermined size are macroblocks of n*n pixels, for example, of 16*16 pixels, and the prediction images are of the same size as the blocks.

Effects of the Invention

According to the image encoding apparatus of the present invention having the stated structure, (i) the first processing unit generates candidate designation information for each of the blocks based on candidate designation information of a prior block and, (ii) the second processing unit, in parallel with the processing by the first processing unit, for one of the blocks which has been processed by the first processing unit, selects a prediction image from among the plurality of prediction images indicated by the candidate designation information of the one of the blocks, based on the prediction image designation information designating a prediction image for a prior block processed prior to the one of the blocks. Consequently, for each of the blocks, compression encoding processing can be started even when a prediction image has not been determined for the prior block processed prior to the block at the start of the processing by the first processing unit.

In other words, because encoding processing of each block can be started without waiting for the prediction image of the prior block of the block to be determined, the encoding processing can be speeded up.

In addition, by using, for example, motion information (a motion vector and a reference image) candidates as the candidate designation information, candidate designation information of each block is composed of motion information candidates generated based on motion information candidates of a prior block. This enables encoding in the skip mode or spatial direct mode according to MPEG4AVC, thereby suppressing code amounts.

The above-described image encoding apparatus may compression encode a plurality of images which are input sequentially, and each candidate designation information may include designation information designating, as one of the candidates for the prediction image of the corresponding block, one of the plurality of prediction images which is generated based on a motion vector detected by searching one of the plurality of images that is other than the image being compression encoded.

According to the stated structure, when the image encoding apparatus uses, for example, a motion vector defined by the inter prediction (inter mode) according to MPEG4AVC as the motion vector detected by searching another image, the candidate designation information includes designation information designating a prediction image according to the inter prediction (inter mode).

Accordingly, the image encoding apparatus realizes compression encoding with suppressed code amounts by selecting for each block, for example, a prediction image which minimizes the code amount, from among the multiple prediction image candidates indicated by the prediction image designation information.

Each candidate designation information of the above-described image encoding apparatus may include designation information designating, as a plurality of candidates among the candidates for the prediction image of the corresponding block, out of the plurality of prediction images, two or more prediction images generated based on motion vectors of a plurality of adjacent blocks including the prior block of the corresponding block, the plurality of adjacent blocks being located in predetermined positions with respect to the corresponding block.

According to the stated structure, when the image encoding apparatus uses, for example, predetermined macroblocks used in the skip mode according to MPEG4AVC standard as the adjacent blocks, the prediction image candidates indicated by candidate designation information include prediction images encoded in the skip mode or the spatial direct mode. Accordingly, the code amount can be suppressed when these prediction images are selected.

The above-described image encoding apparatus may further comprise a third processing unit operable to cause each candidate designation information to include designation information designating, as one of the candidates for the prediction image of the corresponding block, one of the plurality of prediction images which is generated based on one or more pixel values of one or more pixels located in predetermined positions with respect to the corresponding block, and the second processing unit may select the prediction image for the prior block of the corresponding block, from among the plurality of prediction images indicated by the candidate designation information caused by the third processing unit to have the designation information.

According to the stated structure, when the image encoding apparatus uses, for example, pixel values of predetermined pixels defined by the intra prediction (intra mode) according to MPEG4AVC, the candidate designation information includes designation information designating a prediction image candidate in the intra prediction (intra mode).

Accordingly, the image encoding apparatus realizes compression encoding with suppressed code amounts by selecting for each block, for example, a prediction image which minimizes the code amount, from among the multiple prediction image candidates indicated by the candidate designation information.

Each candidate designation information of the above-described image encoding apparatus may be generated also based on prediction image designation information of one of the blocks which has been processed by the second processing unit.

According to the stated structure, for example, given that the processing target block of the first processing unit is MBn, the processing target block of the second processing unit is MBn−1, and the block which has been processed by the second processing unit is MBn−2, the image encoding apparatus generates the candidate designation information of MBn based on the candidate designation information of MBn−1 which is generated based on the candidate designation information of MBn−2. In this way, that is to say, by generating the candidate designation information of MBn based on the prediction image designation information of MBn−2 which has been processed by the second processing unit, the image encoding apparatus is able to suppress the number of the prediction image candidates indicated by the candidate designation information of MBn.

Each candidate designation information of the above-described image encoding apparatus may be generated based on information designating only some of the plurality of prediction images which are candidates for the prediction image of the prior block of the corresponding block.

According to the stated structure, the image encoding apparatus generates the candidate designation information of the encoding target block based on only some of the prediction image candidates of the previous block. This suppresses the number of the prediction image candidates indicated by the candidate designation information, thereby enabling a reduction in the processing load of the image encoding apparatus.

The above-described image encoding apparatus may perform processing in a pipeline structure composed of two stages that are a first stage and a second stage. Here, the first processing unit processes the first stage and includes: a motion detection unit operable to generate, for each of the blocks, the candidate designation information including designation information designating, as one of the candidates for the prediction image of the block, one of the plurality of prediction images which is generated based on a motion vector detected by searching an image other than the image being compression encoded; and a motion vector speculative calculation unit operable to cause the candidate designation information of the block to include designation information designating, as a plurality of candidates among the candidates for the prediction image of the block, out of the plurality of prediction images, two or more prediction images generated based on motion vectors of a plurality of adjacent blocks including the prior block, the plurality of adjacent blocks being located in predetermined positions with respect to the block, and the second processing unit processes the second stage and includes: a motion vector determination unit operable to, based on the prediction image designation information of the block prior to the one of the blocks, select a prediction image out of the one or more prediction images designated by the designation information caused by the motion vector speculative calculation unit to be included in the candidate designation information of the one of the blocks; and a mode judgement unit operable to (i) select the prediction image for the one of the blocks, from among the prediction image selected by the motion vector determination unit and the prediction image indicated by the designation information generated by the motion detection unit, (ii) output the difference signal, and (iii) generate the prediction image designation information designating the selected prediction image.

According to the stated structure, (i) the candidate designation information generated for each block by the first processing unit includes designation information designating multiple prediction image candidates of the block based on the candidate designation information, generated by the motion vector speculative calculation unit, of the prior block, and (ii) the motion vector determination unit in the second processing unit selects one of the multiple prediction image candidates indicated by the designation information generated by the motion vector speculative calculation unit based on the prediction image designation information of the block prior to the one of the blocks. Thus, even when the prediction image of the prior block has not been determined when the first processing unit starts processing, the compression encoding of the block can be started.

Additionally, the candidate designation information corresponding to each of the blocks includes designation information generated by the motion detection unit, and the mode judgement unit in the second processing unit selects the prediction image from among (a) the prediction image candidate selected by the motion vector determination unit and (b) the prediction image candidate, among the prediction image candidates indicated by the candidate designation information, indicated by the designation information generated by the motion detection unit. Consequently, by selecting for each block, for example, a prediction image which minimizes the code amount, the image encoding apparatus realizes the compression encoding which suppresses the code amount.

BRIEF DESCRIPTION OF THE DRAWINGS

FIG. 1 is a diagram for explaining a process flow of pipeline processing performed by an image encoding apparatus 100 of a first embodiment of the present invention;

Figure 2:
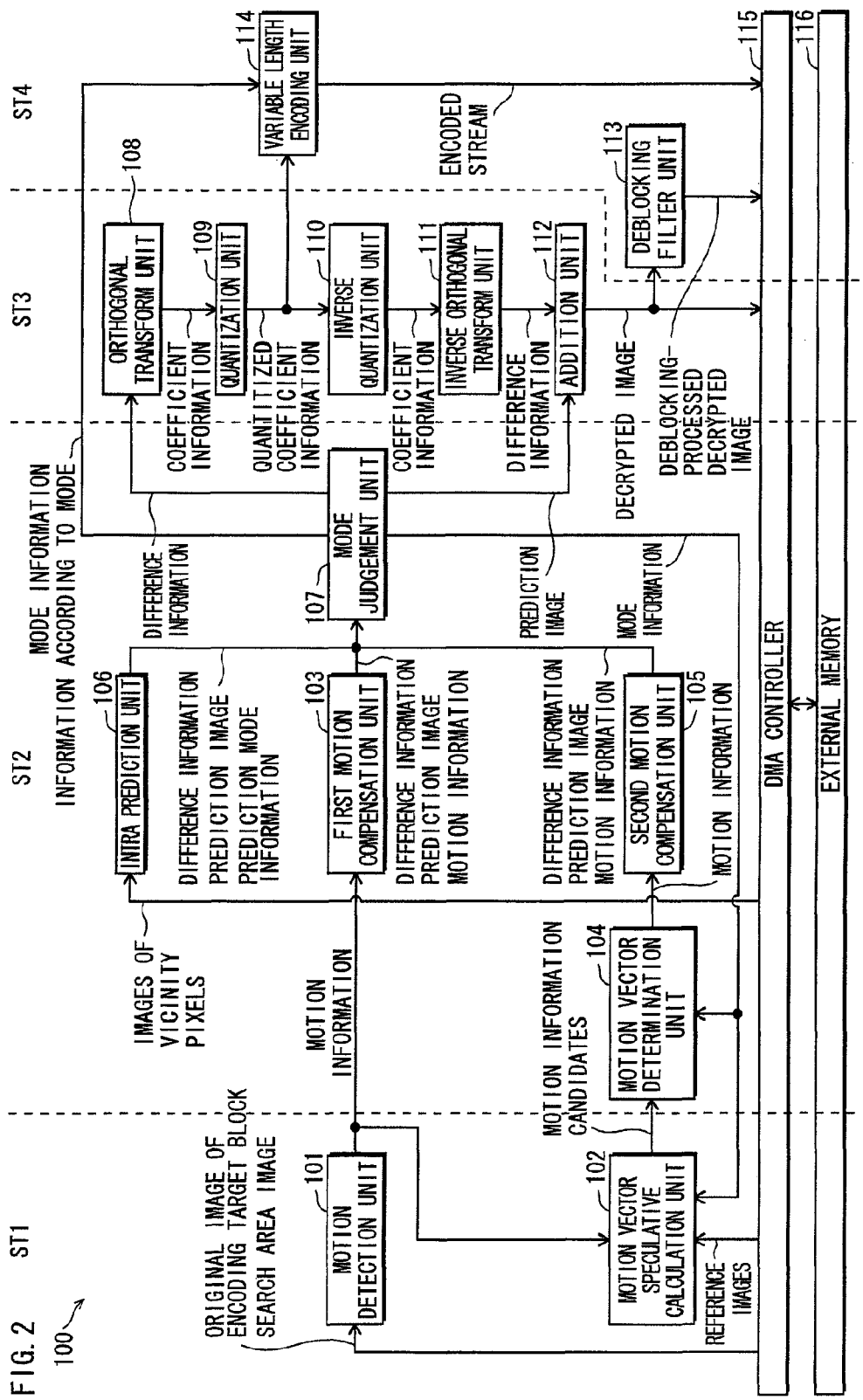
FIG. 2 is a diagram showing a functional structure of the image encoding apparatus 100 of the first embodiment.

DESCRIPTION OF REFERENCE NUMERALS 100, 200 Image encoding apparatus
101 Motion detection unit
102, 201 Motion vector speculative calculation unit
103 First motion compensation unit
104, 203 Motion vector determination unit
105 Second motion compensation unit
106 Intra prediction unit
107, 204 Mode judgement unit
108 Orthogonal transform unit
109 Quantization unit
110 Inverse quantization unit
111 Inverse orthogonal transform unit
112 Addition unit
113 Deblocking filter unit
114 Variable length encoding unit
115 DMA controller
116 External memory
202 Confirmation unit

BEST MODE FOR CARRYING OUT THE INVENTION

Embodiments of the present invention are described below with reference to the drawings.

First Embodiment

<Outline>

An image encoding apparatus of a first embodiment is a modification of an image encoding apparatus that conforms to the MPEG4AVC standard and encodes an encoding target image in units of macroblocks of a predetermined size (for example, 16*16 pixels) using pipeline processing.

The image encoding apparatus of the first embodiment selects, for each macroblock, an encoding mode out of three encoding modes, which are the intra mode, inter mode, and skip mode, so as to minimize the code amount of the macroblock, and encodes the macroblock using the selected encoding mode.

In the following, a brief description is given on each encoding mode.

The intra mode is an encoding mode that (i) generates a prediction image of an encoding target block based on pixel values of pixels (hereinafter, referred to as "adjacent pixels") adjacent to the encoding target block which is the macroblock targeted for encoding, and (ii) encodes the difference information indicating the difference between the generated prediction image and the original image.

In the following, the adjacent pixels are described with reference to FIG. 6.

Figure 6:
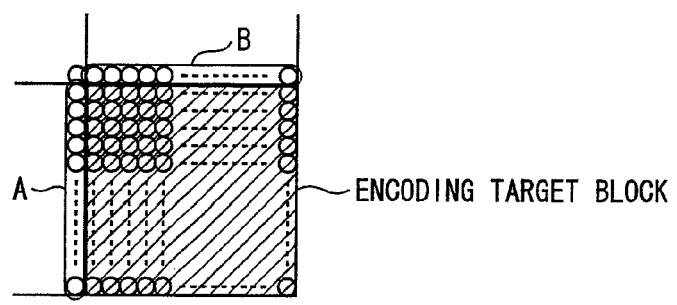
FIG. 6 is a diagram for explaining relationships between an encoding target block and adjacent pixels.

FIG. 6 is a diagram for explaining relationships between the encoding target block and the adjacent pixels.

The adjacent pixels refer to, with respect to the encoding target block shown in FIG. 6, 16 pixels on the left (pixels A in the figure) and 16 pixels on the top (pixels B in the figure).

Generation of the prediction image is performed, upon selection of a prediction mode out of multiple prediction modes (vertical prediction, horizontal prediction, and the like), using the pixel values of the adjacent pixels which correspond with the selected prediction mode. In other words, pixel values of different adjacent pixels are used in accordance with each prediction mode.

For example, when the vertical prediction is selected as the prediction mode, the prediction image is generated on the assumption that the pixel value of each column of pixels in the encoding target block is equivalent to the pixel value of the pixel in the same column in B in FIG. 6.

It should be noted that while selection methods of the prediction mode are prior arts and thus not described in detail here, it is possible to apply a method which makes a selection based on prediction modes of macroblocks in the vicinity.

The inter mode is an encoding mode which (i) detects a motion vector indicating a relative position with respect to a block resembling to the encoding target block, by searching an image (hereinafter, referred to as "search area image") other than the encoding target image containing the encoding target block, (ii) generates a prediction image of the encoding target block based on motion information composed of the detected motion vector and a reference image number indicating the search area image, and (iii) encodes (a) the difference information indicating the difference between the generated prediction image and the original image of the encoding target block and (b) the motion information.

The skip mode is an encoding mode which (i) calculates the motion information of the encoding target block using the motion information of the adjacent blocks which are multiple macroblocks adjacent to the encoding target block, (ii) generates a prediction image of the encoding target block based on the calculated motion information, and (iii) encodes the difference information indicating the difference between the generated prediction image and the original image of the encoding target block. Thus, according to the skip mode, only the difference information is encoded, and it is not necessary to encode motion information. Accordingly, the code amount can be reduced.

Here, the adjacent blocks are described with reference to FIG. 7.

Figure 7:
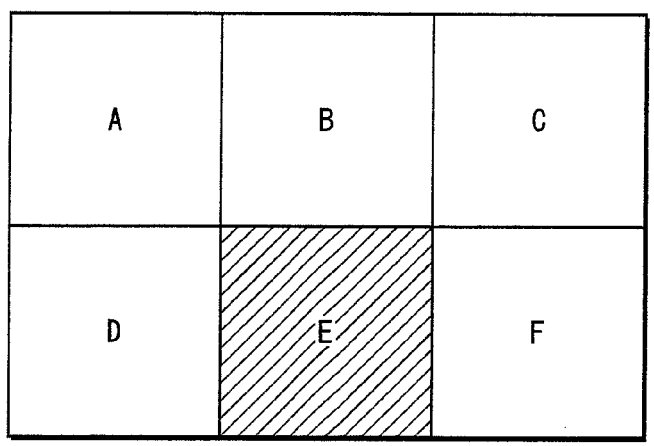
FIG. 7 is a diagram for explaining relationship between an encoding target block and adjacent blocks.

FIG. 7 is a diagram for explaining relationship between an encoding target block and adjacent blocks. Among macroblocks A to F shown in the figure, if the block E is the encoding target block in the skip mode, then the adjacent blocks refer to the blocks B to D.

However, if the motion information of the block C cannot be used because, for example, the block C does not exist, the block A replaces the block C as one of the adjacent blocks of the block E. In addition, if all the motion information of the blocks A to C cannot be used because, for example, none of the blocks A to C exists in the encoding target image, the block D becomes the only adjacent block of the block E. Note that, hereinafter, the block D on the left of the encoding target block E is called "the previous block".

When the blocks B to D are the adjacent blocks of the block E, the motion vector of the block E is determined by finding out the medians of the horizontal components and vertical components of the motion vectors of the blocks B to D. It should be noted that when the adjacent blocks include a macroblock encoded in the intra mode, the motion vector of the block E is calculated assuming that the motion vector of the macroblock is "0".

Additionally, the reference image of the block E in the skip mode is an image displayed immediately preceding the encoding target image which contains the block E, and the reference image number is "0".

It should be noted that the reference image number is a number indicating the position (relative position) of the reference image, in terms of display order, with reference to the encoding target image containing the encoding target block. The further the reference image is from the encoding target image in terms of the display order, the larger the reference image number assigned to the reference image is.

In the following, the image encoding apparatus of the first embodiment is specifically described with reference to FIG. 1.

FIG. 1 is a diagram for explaining a process flow of pipeline processing performed by the image encoding apparatus of the first embodiment.

The image encoding apparatus of the first embodiment (i) selects an encoding mode for each macroblock in the encoding target image such that the code amount of the macroblock is minimized and (ii) encodes the macroblock in the selected encoding mode. Starting from the upper left macroblock, the image encoding apparatus processes a row of macroblocks in the horizontal direction, moves on to the next row to continue processing, and in a similar manner, sequentially processes the macroblocks up to the bottom right macroblock.

As shown in FIG. 1, processing by the image encoding apparatus of the first embodiment is a 4-stage pipeline structure composed of the first to fourth stages, and in each time slot (TS1, TS2, TS3, TS4, . . . ) processing of the pipeline stages are performed in parallel.

In the following, the outline of the processing in each pipeline stage is described with a focus on a macroblock (MBn) which is processed n-th.

First, in the first stage, (a) detection of the motion information in the case of encoding MBn in the inter mode and (b) calculation of the motion information in the case of encoding MBn in the skip mode are performed in parallel.

Next, in the second stage, (a) generation of prediction images assuming that MBn is encoded in the respective encoding modes and (b) calculation of difference information each indicating difference between each prediction image and the original image are performed in parallel so as to determine, for MBn, the encoding mode which minimizes the code amount thereof.

Next, in the third and fourth stages, MBn is encoded in the encoding mode determined in the second stage as the encoding mode for MBn, and an encoded stream is generated.

As is clear from above, to calculate the motion information of MBn in the skip mode in the first stage, the motion information of MBn−1, which is the previous block of MBn, is required. However, the encoding mode of MBn−1 is determined upon completion of the processing in the second stage.

Accordingly, when the first-stage processing of MBn starts (when TS1 starts), the second-stage processing for MBn−1 is about to start, and thus, the encoding mode of MBn−1 has not been determined. In other words, the motion information of MBn−1 has not been determined.

Consequently, in the first stage, the image encoding apparatus of the first embodiment calculates pieces of motion information (hereinafter, referred to as "motion information candidates") for MBn in the skip mode, the pieces of motion information corresponding to the cases where the encoding mode of MBn−1 is assumed to be one of the above-described encoding modes (intra mode, inter mode, and skip mode), respectively. In other words, three pieces of motion information are calculated as candidates for the motion information of MBn in the skip mode.

Also, since the second-stage processing of MBn−1 has been completed when the second-stage processing of MBn starts (when TS2 starts), the encoding mode of MBn−1 has been determined.

Accordingly, in the second stage, from among the three motion information candidates for the motion information of MBn in the skip mode, which have been calculated in the first stage, the motion information candidate corresponding to the determined encoding mode for MBn−1 is selected as the motion information of MBn in the skip mode. Following that, the prediction image of MBn in the skip mode is generated based on the selected motion information, and the difference information indicating the difference between the generated prediction image and the original image of MBn is calculated.

Additionally, in the second stage, in parallel with the above processing, the prediction images of MBn in the intra mode and inter mode are generated, and the difference information each indicating difference between each prediction image and the original image of MBn is calculated. It should be noted that the prediction image of MBn in the inter mode is generated based on the motion information detected in the first stage.

Furthermore, in the second stage, upon completion of calculating the difference information for each of the encoding modes (intra mode, inter mode, and skip mode) of MBn, the code amount in each encoding mode is calculated using the difference information of the encoding mode, and the encoding mode which yields the least code amount is determined as the encoding mode for MBn.

Thus, being able to start processing the encoding target block without waiting for the determination of the motion information of the previous block, the image encoding apparatus of the first embodiment allows the encoding of the encoding target block in the skip mode, thereby suppressing the coding amount while maintaining the high-speed encoding processing using the pipeline structure.

<Structure>

First, the structure of the image encoding apparatus 100 of the first embodiment is described with reference to FIG. 2.

FIG. 2 is a diagram showing the functional structure of the image encoding apparatus 100.

As shown in FIG. 2, the image encoding apparatus 100 includes a motion detection unit 101, a motion vector speculative calculation unit 102, a first motion compensation unit 103, a motion vector determination unit 104, a second motion compensation unit 105, an intra prediction unit 106, a mode judgement unit 107, an orthogonal transform unit 108, a quantization unit 109, an inverse quantization unit 110, an inverse orthogonal transform unit 111, an addition unit 112, a deblocking filter unit 113, a variable length encoding unit 114, a DMA controller 115, and an external memory 116.

Also, although not depicted, the image encoding apparatus 100 is equipped with a CPU (Central Processing Unit) and an internal memory, and each function of the above-mentioned motion detection unit 101, motion vector speculative calculation unit 102, first motion compensation unit 103, motion vector determination unit 104, second motion compensation unit 105, intra prediction unit 106, mode judgement unit 107, orthogonal transform unit 108, quantization unit 109, inverse quantization unit 110, inverse orthogonal transform unit 111, addition unit 112, deblocking filter unit 113, and variable length encoding unit 114 is realized by causing the CPU to execute programs stored in the internal memory.

Additionally, in the present embodiment, pipeline processing is configured such that (i) processing by the motion detection unit 101 and processing by the motion vector speculative calculation unit 102 correspond to the first stage, (ii) processing by the first motion compensation unit 103, processing by the motion vector determination unit 104, processing by the second motion compensation unit 105, processing by the intra prediction unit 106, and processing by the mode judgement unit 107 correspond to the second stage, (iii) processing by the orthogonal transform unit 108, processing by the quantization unit 109, processing by the inverse quantization unit 110, processing by the inverse orthogonal transform unit 111, and processing by the addition unit 112 correspond to the third stage, and (iv) processing by the deblocking filter unit 113 and processing by the variable length encoding unit 114 correspond to the fourth stage.

Note that the first-stage processing corresponds to the first processing unit of the present invention, and the second-stage processing corresponds to the second processing unit and the third processing unit of the present invention.

The motion detection unit 101 (i) detects the motion vector of the encoding target block in the inter mode, and (ii) transmits, to the motion vector speculative calculation unit 102 and the first motion compensation unit 103, the motion information composed of the detected motion vector and the reference image number indicating the search area image used to detect the motion vector.

Specifically, the motion detection unit 101 (i) reads, from the external memory 116 to the internal memory (not depicted) via the DMA controller 115, the original image of the encoding target block (for example, a macroblock of 16*16 pixels) and the search area image targeted for searching for the motion vector, (ii) performs block-matching between the read original image of the encoding target block and the read search area image, and (c) detects, by finding a macroblock which is most similar to the original image of the encoding target block, the motion vector indicating the relative position to the found macroblock.

It should be noted that regarding the detection of a motion vector, it is possible to detect a motion vector of fractional pixel accuracy (½ pixel accuracy and ¼ pixel accuracy). However, for the sake of description, description is given on the assumption that a motion vector of integer pixel accuracy is detected.

Additionally, the search area image is a decrypted image that has been deblocked and stored in the external memory 116 by the deblocking filter unit 113, which is described later. In the following, the search area image is described as an image immediately preceding, such as in the display order, the encoding target image containing the encoding target block.

Upon detection of the motion vector, the motion detection unit 101 transmits the detected motion vector and the reference image number indicating the search area image, that is to say, the motion information, to the motion vector speculative calculation unit 102 and the first motion compensation unit 103.

The motion vector speculative calculation unit 102 calculates motion information candidates in the skip mode for the encoding target block, and transmits the calculated motion information candidates of the encoding target block to the vector determination unit 104.

That is to say, the motion vector speculative calculation unit 102 calculates the motion information candidates of the encoding target block based on (a) the motion information of the adjacent blocks of the encoding target block except for the previous block, the motion information being stored in the internal memory by the mode judgement unit 107 which is described later, and (b) the motion information each of which corresponds to one of the encoding modes selectable by the previous block whose encoding mode has not been determined.

Specific description is given below on the calculation of the motion information candidates. It should be noted that irrespective of the encoding mode of the previous block, the reference image number is "0".

When it is assumed that the encoding mode of the previous block is the intra mode, the motion vector of the encoding target block is calculated based on the motion vectors of the adjacent blocks including the previous block on the assumption that the motion vector of the previous block is "0". Hereinafter, the motion information calculated under the assumption that the previous block is the intra mode is referred to as "m1".

When it is assumed that the encoding mode of the previous block is the inter mode, the motion vector of the encoding target block is calculated based on (a) the motion vector of the previous block in the inter mode, which has been received from the motion detection unit 101 and (b) the motion vectors of the other adjacent blocks. Hereinafter, the motion information calculated under the assumption that the encoding mode of the previous block is the inter mode is referred to as "m2".

When it is assumed that the encoding mode of the previous block is the skip mode, the previous block also has three possibilities for its motion information in the skip mode.

Thus, the motion vector speculative calculation unit 102, with use of mode information which indicates the encoding mode determined for the macroblock on the left of the previous block and has been received from the mode judgement unit 107, selects, out of the three motion information candidates for the motion information of the previous block in the skip mode, a motion vector corresponding to the encoding mode determined for the macroblock on the left of the previous block as the motion vector of the previous block in the skip mode. The motion vector speculative calculation unit 102 then calculates the motion vector of the encoding target block based on (a) the motion vector in the motion information of the previous block in the skip mode and (b) the motion vectors of the other adjacent blocks. Hereinafter, the motion information calculated under the assumption that the encoding mode of the previous block is the skip mode is referred to as "m3".

It should be noted that the motion vector speculative calculation unit 102 stores, in the internal memory, the motion information candidates (m1 to m3) calculated for the encoding target block. The stored motion information candidates (m1 to m3) are used when calculating the motion information "m3" for the next macroblock to be processed.

In addition, the motion vector speculative calculation unit 102 reads the reference images indicated by the calculated motion information candidates (m1 to m3) from the external memory 116 to the internal memory via the DMA controller 115. These reference images are used when the second motion compensation unit 105 generates the prediction image of the encoding target block in the skip mode, as described later.

The first motion compensation unit 103 (i) generates the prediction image based on the motion information, received from the motion detection unit 101, of the encoding target block in the inter mode, (ii) calculates the difference information indicating the difference between the prediction image and the original image of the encoding target block stored in the internal memory, and (iii) transmits the prediction image, difference information, and motion information to the mode judgement unit 107.

As to the generation of the prediction image, more specifically, the prediction image is a block indicated by the motion vector, the block being within the search area image indicated by the reference mode number received from the motion detection unit 101.

The motion vector determination unit 104 (i) selects, from among the three motion information candidates (m1 to m3), received from the motion vector speculative calculation unit 102, of the encoding target block in the skip mode, a piece of motion information corresponding to the encoding mode of the previous block indicated by the mode information received from the mode judgement unit 107, and (ii) transmits the selected motion information candidate as the motion information of the encoding target block in the skip mode to the second motion compensation unit 105. The mode judgment unit 107 is described below.

For example, when the encoding mode of the previous block is determined to be the inter mode, "m2" is transmitted to the second motion compensation unit 105 as the motion information of the encoding target block in the skip mode.

The second motion compensation unit 105 (i) generates the prediction image based on the motion information of the encoding target block in the skip mode received from the motion vector determination unit 104, (ii) calculates the difference information indicating the difference between the prediction image and the original image of the encoding target block stored in the internal memory, and (iii) transmits, to the mode judgement unit 107, the prediction image, difference information, and motion information in the skip mode which has been received from the motion vector determination unit 104.

As to the generation of the prediction image, specifically, the prediction image is the reference image indicated by the motion information received from the motion vector determination unit 104.

The intra prediction unit 106 (i) reads the images of the adjacent pixels of the encoding target block from the external memory 116 to the internal memory via the DMA controller 115, (ii) generates the prediction image of the encoding target block in the intra mode based on the pixel values of the adjacent pixels, (iii) calculates the difference information indicating the difference between the prediction image and the original image of the encoding target block stored in the internal memory, and (iv) transmits the prediction image, difference information, and the prediction mode information which indicates the prediction mode used to generate the prediction image, to the mode judgement unit 107.

It should be noted that the images of the adjacent pixels read from the external memory 116 by the intra prediction unit 106 is a decrypted image stored into the external memory 116 by the addition unit 112, which is described later.

The mode judgement unit 107 selects, as the encoding mode of the encoding target block, an encoding mode which minimizes the code amount, based on the difference information in the inter mode received from the first motion compensation unit 103, the difference information in the skip mode received from the second motion compensation unit 105, and the difference information in the intra mode received from the intra prediction unit 106. It should be noted that when the encoding is performed in the inter mode, the code amount includes the code amount of the motion information, in addition to the code amount of the above-mentioned difference information.

Furthermore, the mode judgement unit 107 (i) transmits the mode information indicating the determined encoding mode to the vector speculative calculation unit 102 and the motion vector determination unit 104, (ii) transmits the difference information corresponding to the determined encoding mode to the orthogonal transform unit 108, (iii) transmits the prediction image corresponding to the determined encoding mode to the addition unit 112, and (iv) transmits the mode information and information (the motion information when the inter mode is selected, the prediction mode information when the intra mode is selected, and the like) in accordance with the determined encoding mode, to the variable length encoding unit 114.

It should be noted that the mode judgement unit 107 stores the motion information (the motion information in the inter mode or the motion information in the skip mode) in accordance with the determined encoding mode into the internal memory.

The orthogonal transform unit 108 performs orthogonal transform processing such as discrete cosine transform with respect to the difference information received from the mode judgement unit 107, and transmits coefficient information, which is the result of the processing, to the quantization unit 109.

The quantization unit 109 performs quantization processing with respect to the coefficient information received from the orthogonal transform unit 108, and transmits the quantized coefficient information to the inverse quantization unit 110 and the variable length encoding unit 114.

The inverse quantization unit 110 performs inverse quantization processing with respect to the quantized coefficient information received from the quantization unit 109 and transmits coefficient information, which is the result of the processing, to the inverse orthogonal transform unit 111.

The inverse orthogonal transform unit 111 performs inverse orthogonal transform processing with respect to the coefficient information received from the inverse quantization unit 110, and transmits difference information, which is the result of the processing, to the addition unit 112.

The addition unit 112 (i) generates a decrypted image of the encoding target block by adding the prediction image received from the mode judgement unit 107 and the difference information received from the inverse orthogonal transform unit 111, and (ii) transmits the generated decrypted image to the deblocking filter unit 113, as well as storing the generated decrypted image into the external memory 116 via the DMA controller 115.

The deblocking filter unit 113, with respect to the decrypted image received from the addition unit 112, performs block noise removal processing (hereinafter, referred to as "deblocking processing"), and stores the deblocking-processed decrypted image into the external memory 116 via the DMA controller 115.

The variable length encoding unit 114 (i) performs variable length encoding processing, arithmetic encoding processing, or the like with respect to the quantitized coefficient information received from the quantization unit 109 and (ii) stores the processed encoded stream into the external memory 116 via the DMA controller 115. It should be noted that the mode information received from the mode judgement unit 107 and the information in accordance with the determined encoding mode are used for generating the header of the encoded stream.

The DMA controller 115 is a general DMA controller which arbitrates access requests from the respective units to the external memory 116 and transmits data between the external memory 116 and the internal memory.

The external memory 116 is a memory composed of a DRAM and the like storing each encoding target block, the decrypted image stored by the addition unit 112, the deblocking-processed decrypted image stored by the deblocking filter unit 113, and the encoded stream stored by the variable length encoding unit 114.

<Operations>

Next, operations of the image encoding apparatus 100 having the stated structure are described with reference to FIG. 3.

Figure 3:
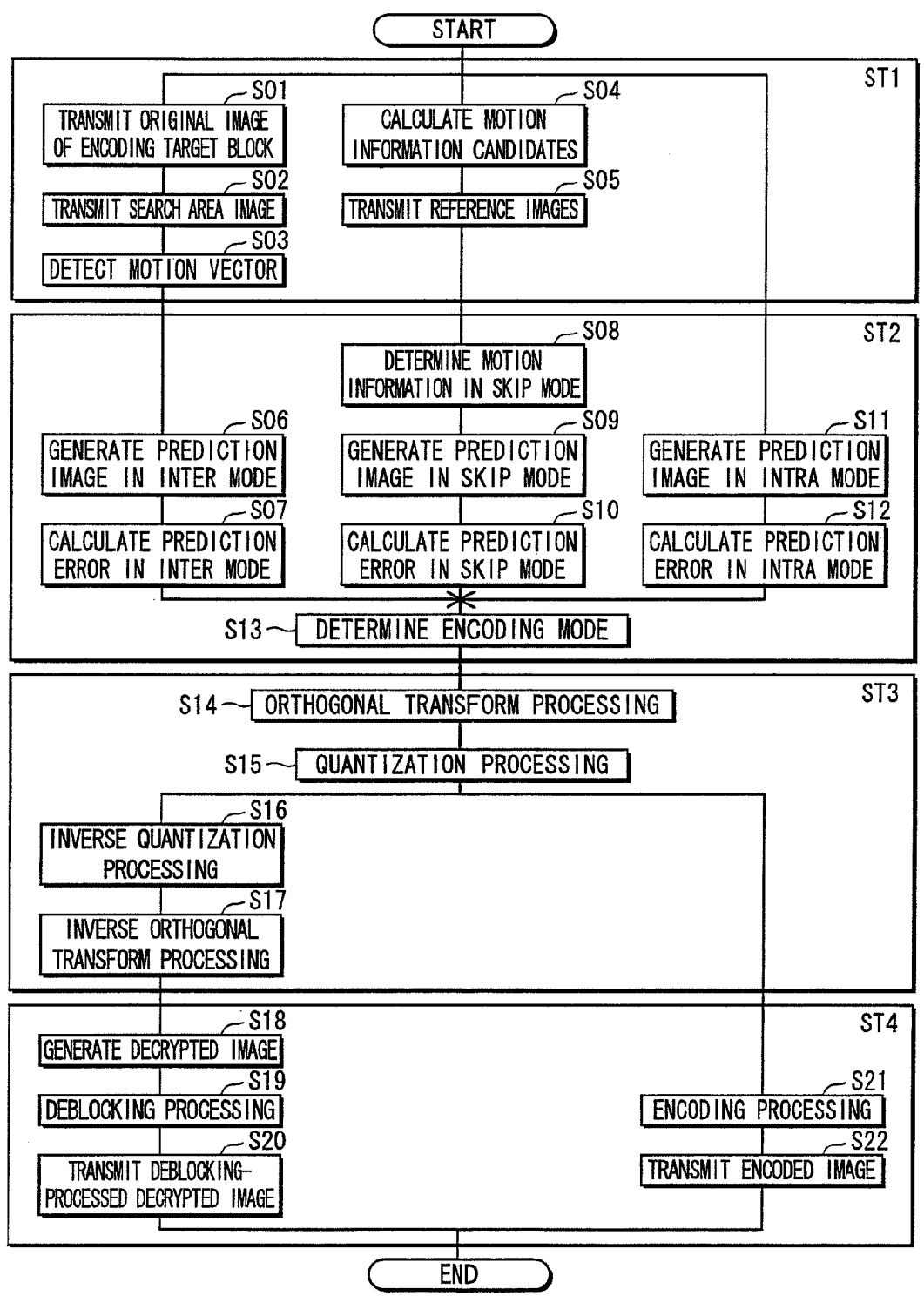
FIG. 3 is a flowchart showing operations of the image encoding apparatus 100 of the first embodiment.

FIG. 3 is a flowchart showing the operations of the image encoding apparatus 100.

In the following, processing by the image encoding apparatus 100 is described in pipeline stage units. It should be noted that the pipeline stages from the first stage to the fourth stage are processed in parallel with one another, each of the pipeline stage targeting a different macroblock for processing.

<Operations in First Stage>

First, operations by the image encoding apparatus 100 in the first stage are described. In the first stage, the processing by the motion detection unit 101 (steps S01 to S03) and the processing by the motion vector speculative calculation unit 102 (steps S04 and S05), which are described below, are executed in parallel.

The motion detection unit 101 reads the original image of the encoding target block and the search area image which is the search target of the motion vector, from the external memory 116 to the internal memory via the DMA controller 115 (steps S01 and S02).

The motion detection unit 101 (i) detects the motion vector by searching the search area image for a macroblock which is most similar to the original image of the encoding target block (step S03) and (ii) transmits the detected motion vector and the reference image number indicating the search area image, that is to say, the motion information, to the first motion compensation unit 103.

On the other hand, the motion vector speculative calculation unit 102 calculates the motion information candidates (m1 to m3) assuming the encoding mode of the previous block of the encoding target block to be the intra mode, inter mode, and skip mode, respectively (step S04), and transmits the calculated motion information candidates (m1 to m3) to the motion vector determination unit 104.

Furthermore, the motion vector speculative calculation unit 102 reads, from the external memory 116 to the internal memory via the DMA controller 115 (step S05), the reference images indicated by the motion information candidates (m1 to m3).

<Operations in Second Stage>

Next, operations by the image encoding apparatus 100 in the second stage are described.

In the second stage, (a) the processing by the first motion compensation unit 103 (steps S06 and S07), (b) the processing by the motion vector determination unit 104 and the second motion compensation unit 105 (steps S08 to S10), and (c) the processing by the intra prediction unit 106 (steps S11 and S12) are executed in parallel with one another. The processing by each unit is described below.

The first motion compensation unit 103 generates a prediction image of the encoding target block in the inter mode based on the motion information received from the motion detection unit 101 (step S06).

The first motion compensation unit 103 (i) calculates the difference information indicating the difference between the generated prediction image and the original image of the encoding target block stored in the internal memory (step S07) and (ii) transmits the calculated difference information, generated prediction image, and motion information received from the motion detection unit 101, to the mode judgement unit 107.

The motion vector determination unit 104 (i) selects, from among the three motion information candidates (m1 to m3) of the encoding target block in the skip mode received from the motion vector speculative calculation unit 102, as the motion information of the encoding target block in the skip mode, the motion information candidate corresponding to the encoding mode of the previous block indicated by the mode information received from the mode judgement unit 107 (step S08), and (ii) transmits the selected motion information to the second motion compensation unit 105.

The second motion compensation unit 105 generates a prediction image of the encoding target block in the skip mode based on the motion information received from the motion vector determination unit 104 (step S09).

The second motion compensation unit 105 (i) calculates the difference information indicating the difference between the generated prediction image and the original image of the encoding target block stored in the internal memory (step S10), and (ii) transmits the calculated difference information, generated prediction image, and the motion information in the skip mode received from the motion vector determination unit 104, to the mode judgement unit 107.

The intra prediction unit 106 reads the images of the adjacent pixels of the encoding target block from the external memory 116 into the internal memory via the DMA controller 115, and generates a prediction image of the encoding target block in the intra mode based on the pixel values of the adjacent pixels (step S11).

The intra prediction unit 106 calculates the difference information indicating the difference between the generated prediction image and the original image of the encoding target block stored in the internal memory (step S12), and transmits the calculated difference information, generated prediction image, and the prediction mode information, to the mode judgement unit 107.

The mode judgement unit 107 selects an encoding mode which minimizes the code amount, from among the encoding modes (the inter mode, skip mode, and intra mode) as the encoding mode of the encoding target block, based on the difference information received from the first motion compensation unit 103, second motion compensation unit 105, and intra prediction unit 106, respectively (step S13).

The mode judgement unit 107 (i) transmits the mode information indicating the determined encoding mode to the vector speculative calculation unit 102 and the motion vector determination unit 104, (ii) transmits the difference information corresponding to the determined encoding mode to the orthogonal transform unit 108, (iii) transmits the prediction image corresponding to the determined encoding mode to the addition unit 112, and (iv) transmits the mode information and information (the motion information when the inter mode is selected, the prediction mode information when the intra mode is selected, and the like) in accordance with the determined encoding mode, to the variable length encoding unit 114.

<Operations in Third Stage>

Next, operations of the image encoding apparatus 100 in the third stage are described.

The orthogonal transform unit 108 performs orthogonal transform processing such as discrete cosine transform with respect to the difference information received from the mode judgement unit 107, and transmits coefficient information, which is the result of the processing, to the quantization unit 109 (step S14). The quantization unit 109 performs quantization processing with respect to the coefficient information received from the orthogonal transform unit 108, and transmits the quantized coefficient information to the inverse quantization unit 110 and the variable length encoding unit 114 (step S15).

The inverse quantization unit 110 performs inverse quantization processing with respect to the quantized coefficient information received from the quantization unit 109, and transmits coefficient information, which is the result of the processing, to the inverse orthogonal transform unit 111 (step S16). The inverse orthogonal transform unit 111 performs inverse orthogonal transform processing with respect to the coefficient information received from the inverse quantization unit 110, and transmits difference information, which is the result of the processing, to the addition unit 112 (step S17).

<Operations in Fourth Stage>

Next, operations of the image encoding apparatus 100 in the fourth stage are described.

In the fourth stage, the processing by the addition unit 112 and deblocking filter unit 113 (steps S18 to S20) and the processing by the variable length encoding unit 114 (steps S21 and S22) are executed in parallel. The processing by these units are described below.

The addition unit 112 (i) generates the decrypted image of the encoding target block by adding the prediction image received from the mode judgement unit 107 and the difference information received from the inverse orthogonal transform unit 111 (step S18), and (ii) transmits the generated decrypted image to the deblocking filter unit 113, as well as storing the generated decrypted image into the external memory 116 via the DMA controller 115.

The deblocking filter unit 113 performs the deblocking processing with respect to the decrypted image received from the addition unit 112 (step S19), and stores the deblocking-processed decrypted image into the external memory 116 via the DMA controller 115 (step S20).

The variable length encoding unit 114 (i) performs variable length encoding processing, arithmetic encoding processing, or the like with respect to the quantitized coefficient information received from the quantization unit 109 (step S21) and (ii) stores the processed encoded stream into the external memory 116 via the DMA controller 115 (step S22).

<Observations>

In the following, effects achieved by the image encoding apparatus 100 of the present embodiment are described in comparison with the image encoding apparatus according to Patent Document 1.

The image encoding apparatus according to Patent Document 1 generates the motion information of the encoding target block in the skip mode using motion information of a vicinity block instead of using the motion information of the previous block. Accordingly, although the high-speed encoding processing using the pipeline structure can be maintained, it is not possible to perform encoding in the skip mode in a case where the motion information of the previous block, which is determined subsequently, differs from the motion information of the vicinity block.

On the other hand, the image encoding apparatus 100 calculates the motion information candidates of the encoding target block in the skip mode based on all the motion information selectable by the previous block of the encoding target block. Following that, upon determination of the motion information of the previous block, the image encoding apparatus 100 selects, out of the calculated motion information candidates, a motion information candidate which corresponds with the determined motion information of the previous block as the motion information of the encoding target block in the skip mode.

Consequently, each macroblock can be encoded in the skip mode reliably without exception, thereby enabling a reduction in the code amount, while the high-speed encoding processing with the pipeline structure is maintained.

Second Embodiment

<Outline>

The motion vector speculative calculation unit 102 of the first embodiment (i) calculates all the motion information candidates of the encoding target block in the skip mode based on all the encoding modes (intra mode, inter mode, and skip mode) selectable by the previous block, and (ii)

acquires all the reference images indicated by the above-mentioned respective motion information candidates.

However, if it is necessary to calculate all the motion information candidates of the encoding target block in the skip mode and acquire all the reference images indicated by those motion information candidates, processing time of the motion vector speculative calculation unit 102, especially processing time for transferring the reference images, requires a large amount of time. Moreover, at the same time, a high-capacity internal memory is required to store all the reference images.

Thus, the motion vector speculative calculation unit of the second embodiment (i) calculates motion information candidates of the encoding target block in the skip mode based on motion information candidates corresponding to, among all the encoding modes selectable by the previous block, the encoding modes which are effective in improving image quality and encoding efficiency, namely, the inter mode and skip mode, and (ii) acquires the reference images indicated by these motion information candidates.

As a result, processing time of the motion vector speculative calculation unit, especially the processing time required for transferring the reference images, can be suppressed, and the capacity of the internal memory can be reduced.

<Structure>

First, the image encoding apparatus 200 of the second embodiment is described with reference to FIG. 4.

Figure 4:
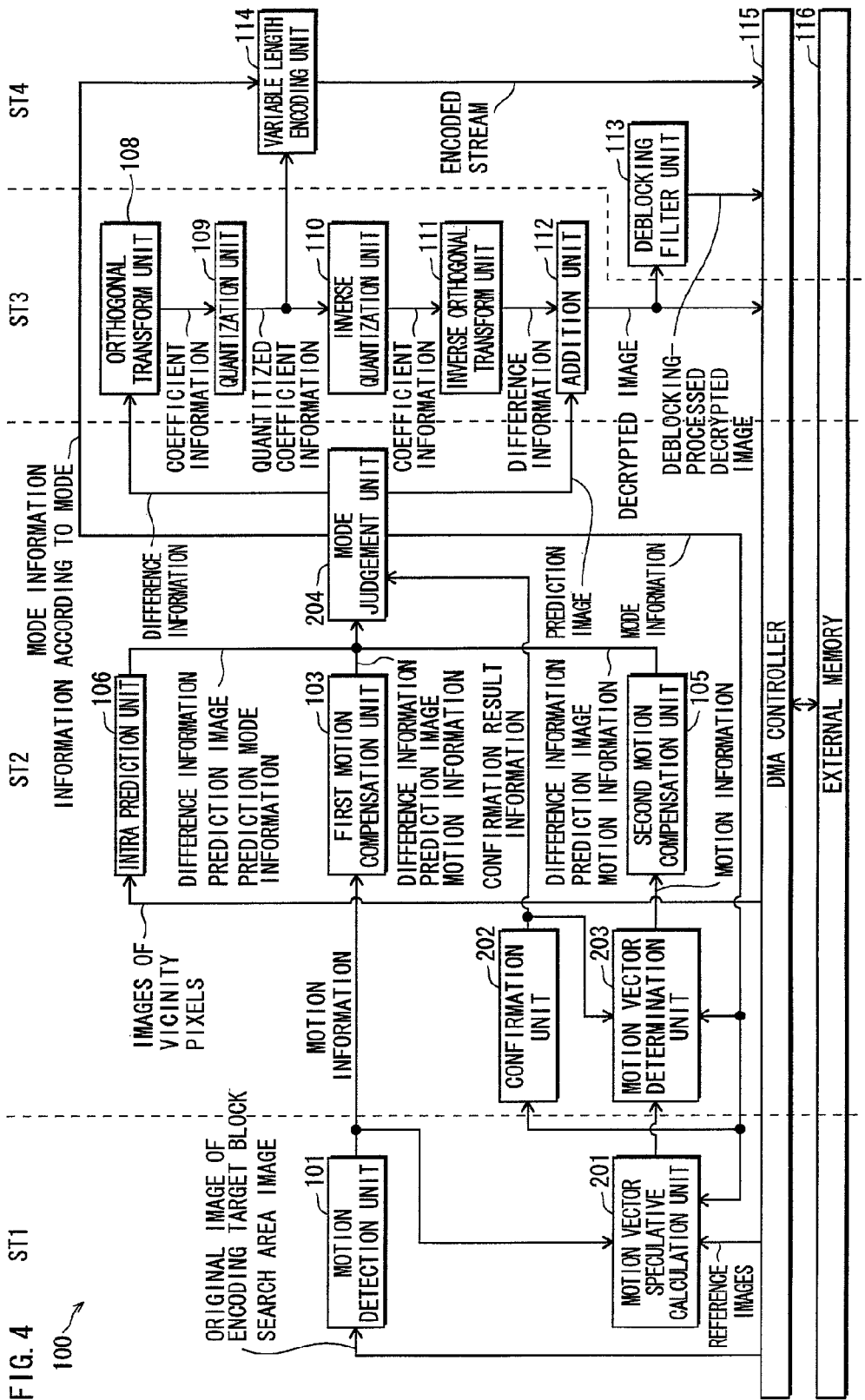
FIG. 4 is a diagram showing a functional structure of an image encoding apparatus 200 of a second embodiment.

FIG. 4 is a diagram showing a functional structure of the image encoding apparatus 200.

As shown in FIG. 4, the image encoding apparatus 200 includes the motion detection unit 101, first motion compensation unit 103, second motion compensation unit 105, intra prediction unit 106, orthogonal transform unit 108, quantization unit 109, inverse quantization unit 110, inverse orthogonal transform unit 111, addition unit 112, deblocking filter unit 113, variable length encoding unit 114, DMA controller 115, external memory 116, a motion vector speculative calculation unit 201, a confirmation unit 202, a motion vector determination unit 203, and a mode judgement unit 204.

The above-mentioned components are the same as those of the image encoding apparatus 100 of the first embodiment except for the motion vector speculative calculation unit 201, confirmation unit 202, motion vector determination unit 203, and mode judgement unit 204, and therefore, their description is omitted here.

Although not depicted, the image encoding apparatus 200 is equipped with the CPU and the internal memory, and each function of the motion vector speculative calculation unit 201, confirmation unit 202, motion vector determination unit 203, and mode judgement unit 204 is realized by causing the CPU to execute programs stored in the internal memory.

Additionally, in the present embodiment, the pipeline processing is configured such that (i) processing by the motion vector speculative calculation unit 201 corresponds to the first stage, and (ii) processing by the confirmation unit 202, processing by the motion vector determination unit 203, and processing by the mode judgement unit 204 correspond to the second stage.

The motion vector speculative calculation unit 201 basically has the same functions as the motion vector speculative calculation unit 102 of the image encoding apparatus 100. However, the motion vector speculative calculation unit 201 is different from the motion vector speculative calculation unit 102 in the following respects: the motion vector speculative calculation unit 201 (i) calculates the motion information candidates (m2 and m3) based on the motion information in the inter mode and in the skip mode, respectively, among the encoding modes selectable by the previous block whose motion information has not been determined, and (ii) transmits the motion information candidates (m2 and m3) to the motion vector determination unit 203 while reading the reference images indicated by the calculated motion information candidates (m2 and m3) from the external memory 116 to the internal memory via the DMA controller 115 as well.

The confirmation unit 202 (i) confirms whether the encoding mode indicated by the mode information of the previous block received from the mode judgement unit 204 is either the inter mode or the skip mode, and (ii) transmits confirmation result information indicating a confirmation result to the motion vector determination unit 203 and mode judgement unit 204.

The motion vector determination unit 203 basically has the same functions as the motion vector determination unit 104 of the image encoding unit 100. However, the motion vector determination unit 203 is different from the motion vector determination unit 104 in the following respects: when the confirmation result indicated by the confirmation result information received from the confirmation unit 202 indicates that the encoding mode of the previous block is neither the inter mode nor the skip mode, that is, the encoding mode of the previous block is indicated to be the intra mode, the motion vector determination unit 203 does not select the motion information of the encoding target block in the skip mode.

The mode judgement unit 204 basically has the same functions as the mode judgement unit 107 of the image encoding apparatus 100. However, the mode judgement unit 204 is different from the mode judgement unit 107 in the following respects: when the confirmation result indicated by the confirmation result information received from the confirmation unit 202 indicates that the encoding mode of the previous block is neither the inter mode nor the skip mode, that is, when the encoding mode of the previous block is indicated to be the intra mode, the mode judgement unit 204 determines an encoding mode other than the skip mode as the encoding mode of the encoding target block.

In other words, when the encoding mode of the previous block is the intra mode, the mode judgement unit 204 determines, as the encoding mode of the encoding target block, one of the inter mode and intra mode so as to minimize the code amount of the encoding target block, based on the difference information in the inter mode received from the first motion compensation unit 103 and the difference information in the intra mode received from the intra prediction unit 106.

<Operations>

Next, operations of the image encoding apparatus 200 having the stated structure are described with reference to FIG. 5.

Figure 5:
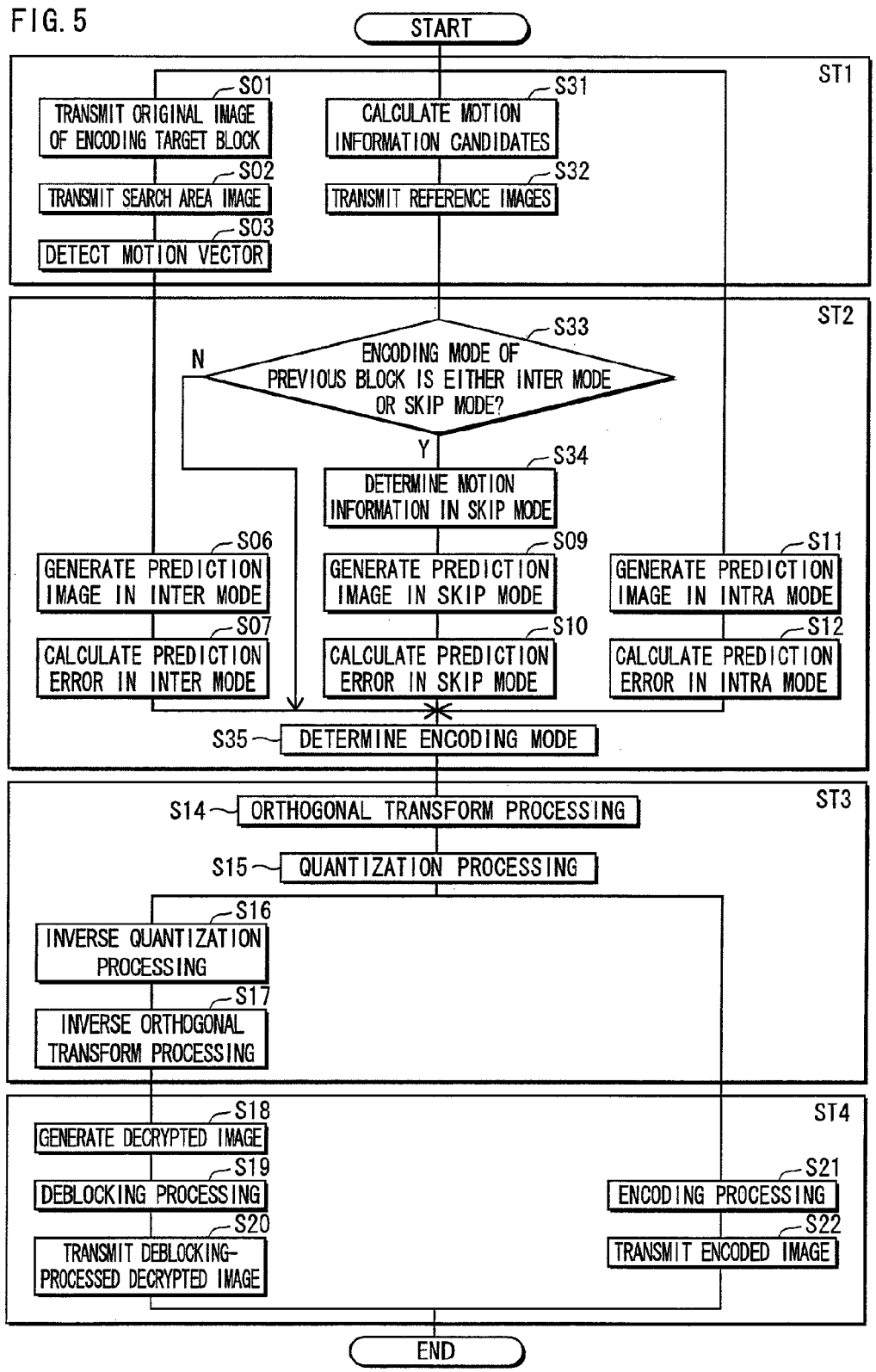
FIG. 5 is a flowchart showing operations of the image encoding apparatus 200 of the second embodiment.

FIG. 5 is a flowchart showing the operations of the image encoding apparatus 200. Since the processing in the steps S01 to S22 are the same as the processing in the corresponding steps of the image encoding apparatus 100, their description is omitted. In the following, only differences between the image encoding apparatus 200 and the image encoding apparatus 100 are described.

In the first stage, in parallel with the processing by the motion detection unit 101 (steps S01 to S03), the motion vector speculative calculation unit 201 (i) assumes the encoding mode of the previous block of the encoding target block to be either the inter mode or the skip mode, (ii) calculates the motion information candidates (m2 and m3) for these modes, respectively (step S31), and (iii) transmits the motion information candidates (m2 and m3) to the motion vector determination unit 203.

Also, the motion vector speculative calculation unit 201 reads the reference images respectively indicated by the motion information candidates (m2 and m3), from the external memory 116 into the internal memory via the DMA controller 115 (step S32).

In the second stage, in parallel with the processing by the first motion compensation unit 103 (steps S06 and S07) and the processing by the intra prediction unit 106 (steps S11 and S12), the confirmation unit 202 (i) confirms whether the encoding mode indicated by the mode information of the previous block received from the mode judgement unit 204 is either the inter mode or the skip mode (step S33) and (ii) transmits the confirmation result information to the motion vector determination unit 203 and the mode judgement unit 204.

If the confirmation result information indicates that the encoding mode of the previous block is either the inter mode or the skip mode (step S33:Y), the motion vector determination unit 203 (i) selects, from among the motion information candidates (m2 and m3) received from the motion vector speculative calculation unit 201, one motion information candidate corresponding to the encoding mode indicated by the mode information of the previous block received from the mode judgement unit 204, as the motion information of the encoding target block in the skip mode (step S34) and (ii) transmits the selected motion information to the second motion compensation unit 105.

As described in the first embodiment, the second motion compensation unit 105 (i) generates the prediction image of the encoding target block in the skip mode (step S09), (ii) calculates the difference information indicating the difference between the prediction image of the encoding target block and the original image (step S10), and (iii) transmits the calculated difference information, generated prediction image, and the motion information in the skip mode received from the motion vector determination unit 203, to the mode judgement unit 204.

If the confirmation result information indicates that the encoding mode of the previous block is neither the inter mode nor the skip mode, that is to say, the encoding mode of the previous block is indicated to be the intra mode (step S33:N), the processing proceeds to the step S35, which is described later, without performing the processing in the step S34, S09, and S10.

The mode judgement unit 204 determines the encoding mode which minimizes the code amount of the encoding target block, as the encoding mode of the encoding target block (step S35).

In other words, in the case where the mode judgement unit 204 receives, from the confirmation unit 202, the confirmation result information indicating that the encoding mode of the previous block is either the inter mode or the skip mode, the mode judgement unit 204 has received a piece of difference information from each of the first motion compensation unit 103, the second motion compensation unit 105, and the intra prediction unit 106. Thus, in this case, the mode judgement unit 204 determines the encoding mode of the encoding target block based on the three pieces of difference information.

On the other hand, in the case where the encoding mode of the previous block is indicated to be neither the inter mode nor the skip mode, that is to say, the encoding mode of the previous block is indicated to be the intra mode by the confirmation result information received from the confirmation unit 202, the mode judgement unit 204 has not received the difference information from the second motion compensation unit 105. Thus, in this case, the mode judgement unit 204 determines the encoding mode of the encoding target block based on the two pieces of difference information received from the first motion compensation unit 103 and the intra prediction unit 106.

<Additional Particulars>

Although the image encoding apparatus of the present invention has been described by way of the embodiments above, it is to be noted that the following modifications are possible, and naturally, the present invention is not limited to the image encoding apparatuses described in the embodiments above.

(1) According to the embodiments, the research area image used by the motion detection unit 101 to detect the motion vector is the decrypted image of the previous image of the encoding target image which includes the encoding target block. However, it is not limited to the decrypted image of the previous image, and can be the decrypted image of an image which precedes the encoding target image by more than one image.

The search area image is also described to be the entire decrypted image of the previous image of the encoding target image. However, it can be part of the encoding target image. For example, the search area image can be a block and 15 pixels in its vicinity in the decrypted image of the previous image of the encoding target image, the position of the block in the previous image being the same as the position of the encoding target block in the encoding target image.

(2) According to the embodiments, processing is performed in the four-stage pipeline structure. However, in accordance with the processing capacity of the CPU, for example, the third stage and the fourth stage in the first embodiment can be merged into one stage so that the processing is performed in a three-stage pipeline structure.

(3) According to the first embodiment, the motion vector speculative calculation unit 102 calculates the motion information candidates of the encoding target block in the skip mode. However, it may calculate motion information candidates in the spatial direct mode.

It should be noted that, according to the embodiments, in the skip mode, the reference image number is "0" irrespective of the encoding mode of the previous block. However, when using the spatial direct mode, it is different from the skip mode in that, with respect to each direction L0 and L1, the smallest image number among the reference image numbers of the adjacent blocks is selected to be the reference image number of the encoding target block.

However, when the reference image number of the adjacent blocks is "−1", that is to say, the encoding mode of the adjacent block is the intra mode, the reference image number of the encoding target block in the spatial direct mode is "0".

It should be noted that the motion vector speculative calculation unit 201 of the second embodiment can be similarly modified.

(4) According to the second embodiment, the motion vector speculative calculation unit 201 calculates the motion information candidates (m2 and m3) based on the motion information in the inter mode and in the skip mode, respectively, among the encoding modes selectable by the previous block whose motion information has not been determined. However, it is not limited to this, and the motion vector speculative calculation unit 201 may calculate motion information candidates (m1 and m3) of the encoding target block based on the motion information in the intra mode and the skip mode, or may calculate a motion information candidate (m3) of the encoding target block based only on the motion information in the skip mode.

In addition, the number of motion information candidates calculated by the motion vector speculative calculation unit 201 is not limited, and it can be determined in accordance with the processing ability and the like of the CPU.

(5) According to the embodiments, the processing by the intra prediction unit 106 is included in the processing in the second stage. However, the processing by the intra prediction unit 106 can be included in the processing in the first stage. That is to say, there is no particular restriction as to in which stage the processing by the intra prediction unit 106 should be included, as long as it is completed before the mode judgement unit 107 (or 204) determines the encoding mode of the encoding target block.

(6) According to the first embodiment, each function of the motion detection unit 101, motion vector speculative calculation unit 102, first motion compensation unit 103, motion vector determination unit 104, second motion compensation unit 105, intra prediction unit 106, mode judgement unit 107, orthogonal transform unit 108, quantization unit 109, inverse quantization unit 110, inverse orthogonal transform unit 111, addition unit 112, deblocking filter unit 113, and variable length encoding unit 114 is realized by causing the CPU to execute programs stored in the internal memory. However, part or an entirety of the processing may be realized by hardware.

In this case, each function is typically realized by an LSI, an integrated circuit. These functions may be integrated into a single chip individually, or part or all of these functions may be integrated into a single chip.

It should be noted that it is the same with each function of the motion vector speculative calculation unit 201, confirmation unit 202, motion vector determination unit 203, and mode judgement unit 204 in the second embodiment.

(7) It is also possible to circulate/distribute a program for CPU to realize each function of the image encoding apparatus by recording the program on a recording medium or using various communication channels. The recording media can be an IC card, an optical disc, a hard disk, a flexible disc, a ROM or the like. The circulated/distributed program is made available for use by being stored in a memory or the like that can be read by the CPU of an apparatus, and each function of the image encoding apparatuses described in the embodiments is realized by execution of the program by the CPU.

(8) According to the embodiments, the image encoding apparatuses conform to MPEG4AVC standards. However, they may conform to another compression encoding method such as MPEG4 or the like.

INDUSTRIAL APPLICABILITY

The image encoding apparatus of the present invention is utilized to speed up encoding processing.

The invention claimed is:

1. An image encoding apparatus that compression-encodes an image in units of blocks having a predetermined size, the image encoding apparatus having a first encoding mode in which a motion vector of an encoding-target block is not encoded and the motion vector of the encoding-target block is calculated based on motion vectors of a plurality of adjacent blocks that are adjacent to the encoding-target block, each of adjacent blocks being an immediate neighbor of the encoding-target block, and each of adjacent blocks preceding the encoding-target block in coding order, the image encoding apparatus comprising:
a processor; and
a non-transitory memory having stored therein executable instructions, which when executed, cause the processor to perform:
speculatively calculating, when the adjacent blocks include an adjacent block whose encoding mode has not yet been determined and in case the encoding-target block is to be encoded in the first encoding mode, one or more motion vector candidates for encoding the encoding-target block in the first encoding mode, each of the one or more motion vector candidates corresponding to one of some or all of possible encoding modes for encoding the adjacent block; and
determining, when the encoding mode for the adjacent block is determined from among the some or all of possible encoding modes, one of the one or more motion vector candidates that corresponds to the encoding mode for the adjacent block as a first motion vector for encoding the encoding target block in the first encoding mode.

2. The image encoding apparatus of claim 1 further operable in a second encoding mode in which inter-image prediction is utilized for encoding and a third encoding mode in which intra-image prediction is utilized for encoding, the processor further performing:
generating a second motion vector for encoding the adjacent block in the second encoding mode;
generating first differential information for the first encoding mode including performing motion compensation using the first motion vector;
generating second differential information for the second encoding mode including performing motion compensation using the second motion vector;
generating third differential information for the third encoding mode including performing intra-image prediction with respect to the adjacent block; and
determining the encoding mode for encoding the adjacent block based on the first differential information, the second differential information, and the third differential information.

3. The image encoding apparatus of claim 2, wherein
a first processing includes (i) the generating a second motion vector for encoding the adjacent block in the second encoding mode and (ii) the speculatively calculating,
a second processing includes (i) the generating the first differential information, (ii) the generating the second differential information, (iii) generating the third differential information, (iv) the determining the one of the one or more motion vector candidates, and (v) determining the encoding mode for encoding the adjacent block, and
the first processing and the second processing are executed in parallel.

4. The image encoding apparatus of claim 3, wherein
the first processing and the second processing are executed in parallel using pipeline processing.

5. An image encoding method that causes a programmed computer to compression-encode an image in units of blocks having a predetermined size, the image encoding method having a first encoding mode in which a motion vector of an encoding-target block is not encoded and the motion vector of the encoding-target block is calculated based on motion vectors of a plurality of adjacent blocks that are adjacent to the encoding-target block, each of adjacent blocks being an immediate neighbor of the encoding-target block, and each of adjacent blocks preceding the encoding-target block in coding order, the image encoding method comprising:

speculatively calculating, when the adjacent blocks include an adjacent block whose encoding mode has not yet been determined and in case the encoding-target block is to be encoded in the first encoding mode, one or more motion vector candidates for encoding the encoding-target block in the first encoding mode, each of the one or more motion vector candidates corresponding to one of some or all of possible encoding modes for encoding the adjacent block; and determining, when the encoding mode for the adjacent block is determined from among the some or all of possible encoding modes, one of the one or more motion vector candidates that corresponds to the encoding mode for the adjacent block as a first motion vector for encoding the encoding target block in the first encoding mode.

\* \* \* \* \*